May 17, 1955  J. C. MACFARLANE ET AL  2,708,733
ELECTRIC GENERATOR AND ITS CONTROL
Filed Nov. 18, 1952  2 Sheets-Sheet 1

Inventors
James Colquhoun Macfarlane
William Ian Macfarlane
By
Richardson, Davis and Nordon
their Attorneys

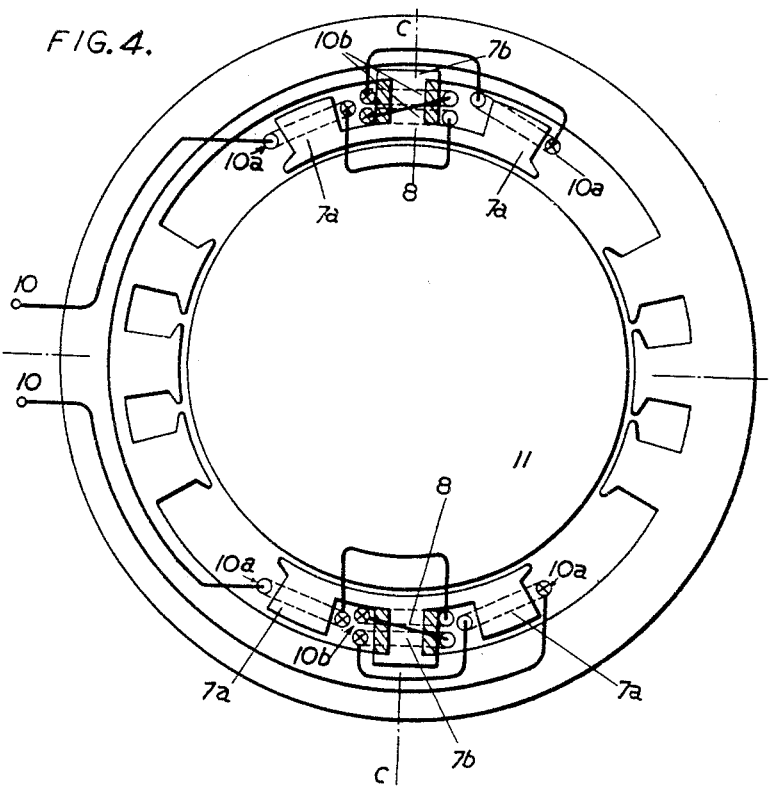

United States Patent Office 2,708,733
Patented May 17, 1955

2,708,733

ELECTRIC GENERATOR AND ITS CONTROL

James C. Macfarlane and William I. Macfarlane, Cathcart, Glasgow, Scotland

Application November 18, 1952, Serial No. 321,129

6 Claims. (Cl. 322—50)

The present invention relates to field systems, for controlling generators, of the type comprising a relatively saturated first part whereof the flux effect on the generator armature varies non-linearly with the field excitation current, and a second part whereof the flux effect on the generator armature varies linearly with the field excitation current, the flux effects of said parts being oppositely directed relative to the armature so that they balance at a predetermined value of field excitation and their resultant flux effect becomes zero, any deviation of the field current from this value resulting in positive or negative resultant flux.

Such machines are used for control and excitation purposes, for example as set forth in co-pending patent application No. 274,687, now Patent No. 2,687,506 and, in a self-amplifying form, in our U. S. Patent No. 2,438,567.

As disclosed in said two specifications the field structure comprises two parts—a relatively magnetically—saturated field part and a relatively unsaturated field part, the excitation windings on these parts being connected in series and acting in opposition with reference to the armature system such that the resultant excitation was self-neutralising at a predetermined input to the windings. In these prior specifications the relatively saturated and unsaturated part-poles were made in the form of small poles such that the flux emanating from one part-pole passed through the armature teeth, through the back iron of the armature and back through the armature teeth to the other part-pole, when the excitation system was in balance. The flux passing and repassing the armature conductors produced positive and negative E. M. F.'s in these conductors, but as the conductors were located in the same section of the armature, that is, between pairs of brushes of opposite polarity, the resultant E. M. F. produced at the brushes was zero when the system was in balance.

This polar arrangement suffered from the disadvantage that the total flux of the part-poles, even at balance, threaded the armature teeth, and thus the voltage which could be obtained from the machine was limited when the armature teeth began to saturate.

An object of the present invention is to obviate or mitigate the above disadvantage.

According to the present invention we provide a field system of the type aforesaid, in which the flux effects of said parts balance within the field system itself, and the resultant flux, under out-of-balance conditions, passes between the field system and the armature.

According to the present invention we also provide a field system of the type aforesaid comprising a relatively saturated and a relatively unsaturated part-pole, magnetic bridge means adapted to be positioned adjacent the armature of the generator and interconnecting one end of each part-pole, said ends being of opposed polarity, variation in the resultant out of balance flux of the two opposed part-poles acting to control the resultant flux at said bridge means, and a magnetic return path completing the magnetic circuit between said part-poles, whereby, when the fluxes of said part-poles are in balance, the fluxes themselves balance in said bridge means, and, when out of balance, the resultant out of balance flux passes between the bridge means and the armature.

Preferably in the field system the end of the relatively unsaturated part-pole remote from the bridge means, and the means forming the magnetic return path define an airgap.

Preferably, also, each pole comprises three circumferentially-spaced part-poles, the central part-pole being relatively saturated and being magnetically connected to the field yoke return path, and the outer part-poles being relatively unsaturated, connected to the central part-pole by the bridge means, and each spaced from the field yoke return path to define an airgap.

Various embodiments of the invention will now be described, by way of example, with reference to the accompanying diagrammatic drawings wherein:

Fig. 4 is an armature and field diagram of a generator having a field system as shown in Fig. 3.

Throughout the drawings, similar parts are denoted by the same reference numerals.

Figure 1:
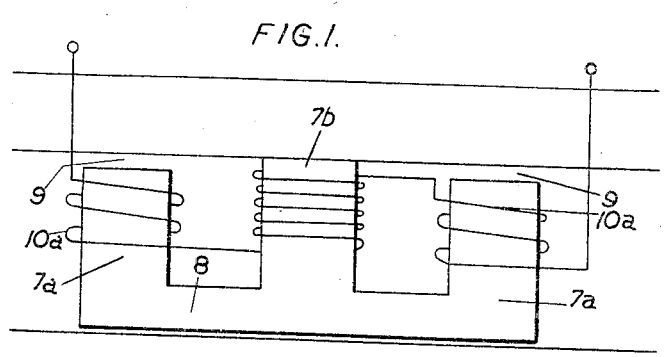
Fig. 1 is a diagrammatic side view of one embodiment of a control pole of a field system according to the invention.

Referring to Fig. 1, each control pole of the field system is divided into three circumferentially-spaced part-poles comprising two outer relatively unsaturated part-poles 7a and there intermediate a relatively saturated part-pole 7b. The part-pole 7b and part-poles 7a are connected by a cross magnetic bridge 8, but an air-gap 9 is left at the base of the part-poles 7a. Excitation coils 10a and 10b are wound on the part-poles 7a, 7b respectively, said coils being connected in series but in magnetic opposition.

To distinguish the various parts, hereinafter the saturated part-poles 7b of each control pole is called the "abutment" part-pole, the coil 10b which magnetises it is called the "abutment" coil, the outer unsaturated part-poles 7a are called the "control" part-poles and the coils 10a mounted on them are called the "control" coils. In their effect on the armature the control coils 10a act in opposition to the abutment coils. In the example shown in Fig. 1, the control coils 10a may be mounted solely on the control part-poles 7a. The abutment part-pole 7b may be magnetised to any suitable degree, but generally speaking the balancing point will be well over the knee of the magnetic saturation curve for the material of which the abutment pole is made so that the magnetic flux effect of the abutment part-pole 7b varies non-linearly with the magnetising current.

The abutment part-pole 7b has, in a normal machine, a section considerably less in area than the total area of the two control part-poles 7a.

The coils 10b on the abutment part-pole 7b are of high M. M. F., so that the magnetisation curve rises rapidly as the control circuit current increases from zero but bends over quickly as the part-pole approaches magnetic saturation. On the other hand the magnetisation graph of the coils 10a on the unsaturated control part-poles 7a, which as aforesaid have a greater sectional area and have a smaller M. M. F., rises more slowly, and thus gives a resultant flux effect which varies linearly with magnetising current.

In previously proposed constructions the abutment winding had more turns than the opposition coils so as to saturate magnetically the centre link. However, as shown in Fig. 1, in order to force the flux in the control part-poles 7a across the gaps 9 at the base of these part-poles to the return circuit, the M. M. F. of the coils 10a on the part-poles 7a has to be somewhat greater than in these other methods of construction so that the M. M. F.'s of the opposing part-poles may approach those of one another. In the limiting case where the M. M. F.'s on both part-poles 7a, 7b are equal to M. M. F. required to overcome the saturation of the abutment part-pole 7b must be equal to that required to pass the flux from the control part-poles 7a across the gap 9 at the back of the pole.

When the pole operates at balance the magnetic flux emanating from the control part-pole 7a is equal to that returning into the abutment parts and passes along the magnetic bridges 8 without linking the armature conductors. When a lower or higher control current flows in the field winding the fluxes from the part-poles do not balance and a difference flux flows through the armature producing the required E. M. F., that is, when the field current is decreased this causes an immediate reduction of flux in the unsaturated part-poles 7a, but the flux in the saturated part-hole 7b does not decrease appreciably and the resultant or difference flux enters the armature via the saturated part-pole 7b. When, however, the field current is increased the flux in the saturated part-pole 7b cannot increase appreciably, while the opposition flux in the unsaturated pole-parts 7a increases rapidly, and the resultant of difference flux therefore tends to pass from the armature to the pole. The construction therefore differs from the earlier construction where the fluxes always flow in the armature teeth and two M. M. F.'s were produced which opposed; the net E. M. F. appearing at the brushes.

Figure 2:
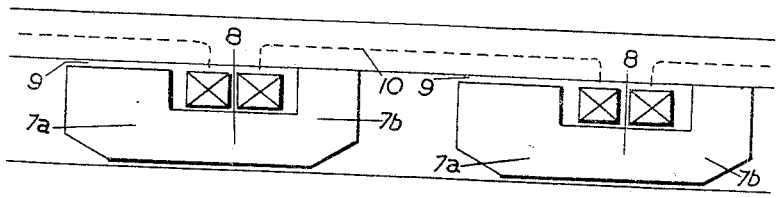
Fig. 2 is a diagrammatic side view of a further embodiment of one pole of a field system according to the invention.

In a second form of construction flux balance again occurs within the pole pieces of the field system, but in this case the pole pieces are made in the shape of a U as shown in Fig. 2. As before, one limb 7b of the U piece is of small section while the other 7a is of larger section, the two being joined at the ends nearer to the armature by the usual magnetic bridge 8. Each part-pole 7a has an air-gap 9 between its outer end and the yoke iron which comprises the return circuit. In this case the control circuit may consist of only one coil 10 per pole, but the coil spans from the inside of the U of one pole to the inside of the U on the adjacent pole surrounding one control and one abutment part-pole from each of these poles. It will be seen that as the adjacent poles are of opposite polarity, then the coil which produces a positive direction flux, say, in the abutment part-pole of one pole, will produce an opposition flux on the control part-pole of the adjacent pole. By suitable adjustment of the saturation and the airgap under the control part pole the flux emanating from the pole can be made zero at any desired value of the field current. In the construction of Fig. 1 the magnetic bridge 8 at the armature end of the pole part is only of half the size of that required in Fig. 2 since the whole flux must traverse the bridge 8 in this latter figure. The consequent saving of room on the field coils, however, in the construction according to Fig. 2 is normally sufficient to mean that the latter is no larger in outside physical dimensions than the construction shown in Fig. 1.

Figure 3:
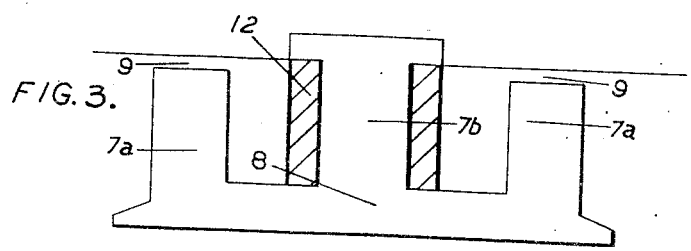
Fig. 3 is a view similar to Fig. 1 and showing a modified form of control pole.

As shown in Fig. 3, the complete pole (or alternatively the abutment pole body) may be made as a separate unit of a higher retentivity iron than normal in order to assist self-excitation, and the production of short circuit currents. However, as the abutment part-pole residual produces flux over the whole pole face across a comparatively small gap while the residual of the control part-poles has to force flux across the gap 9 at the base of the part-poles of relatively greater length and smaller area, the effect of the residual of the abutment part-pole is greatly increased, and would normally be sufficient to cause self-excitation of the correct polarity.

Also as shown in Fig. 3, it is desirable to surround the abutment part-pole 7b with an amortisseur coil 12 and preferably to use said coil to clamp the pole stampings together.

As outlined in co-pending patent application No. 274,687 it may be desirable to wind compounding coils on the control part-poles 7a. It may also be desirable, in some instances, to add armature compensating windings to any of the above constructions.

In the aforementioned embodiments, when the pole operates at balance between M. M. F. and voltage, the magnetic flux emanating from the abutment part-pole 7b is equal to that returning into the control part-poles 7a, and merely passes along the magnetic bridge 8 without linking the armature conductors. When a lower or higher control current flows in the abutment and control circuits the fluxes from the part-poles do not balance and a "difference" flux flows through the armature, producing the required control E. M. F. This construction, therefore, differs from the other construction in which the fluxes flow in the armature and two E. M. F.'s are produced which oppose the net E. M. F. appearing at the brushes.

The construction according to Fig. 1 is suitable, for example, for incorporation in both machines disclosed in co-pending patent application No. 274,687 and in our Patent No. 2,438,567, while that of Fig. 2 is suitable for the machine disclosed in co-pending patent application No. 274,687.

A typical example of the application of the embodiment shown in Fig. 1 to the machine disclosed in Patent No. 2,438,567 is shown in Fig. 5, the part-poles 7a, 7b and bridge 8 taking the place of the saturated and unsaturated part-poles 3a, 3b in said patent specification.

The constructions shown in Figs. 1 and 2 may be incorporated in multi-polar machines up to any required number of poles.

We claim:

1. For controlling dynamoelectric generators, a field system having poles each comprising three circumferentially-spaced part-poles, the central part-pole being relatively saturated and the outer part-poles being relatively unsaturated; a set of field coils wound on the central part-pole; a further set of field coils wound on each of the outer part-poles; a control circuit having said sets of field coils connected therein so as to act on the armature in opposition; magnetic bridge means adapted to be positioned adjacent the armature of the generator and interconnecting one end of each part-pole, the appropriate ends of the outer part-poles being of opposed polarity to that of the central part-pole, variation in the resultant out of balance flux of the two opposed part-poles acting to control the resultant flux at said bridge means; and a field yoke return path, said central pole part being magnetically connected to said return path, and said outer pole parts each being spaced from said return path to define an air-gap, whereby, when the fluxes of said part-poles are in balance, the fluxes themselves balance in said bridge means, and, when the fluxes are out of balance, the resultant out of balance flux passes between the bridge means and the armature.

2. For controlling dynamoelectric generators a field system having poles each comprising at least two circumferentially-spaced part-poles, the first of said part-pole being relatively saturated and each other part-pole being relatively unsaturated; a set of field coils wound on the relatively saturated part-pole; a further set of field coils wound on each relatively unsaturated part-pole; a control circuit having said sets of field coils connected therein so as to act on the armature in opposition; magnetic bridge means positioned adjacent the armature of the generator and interconnecting one end of each part-pole, said interconnected ends being of opposed polarity, variation in the resultant out of balance flux of the opposed part-poles acting to control the resultant flux at said bridge means; and a field yoke return path magnetically connected to the first part-pole and completing the magnetic circuit between said part-poles, whereby, when the fluxes of said part-poles are in balance, the fluxes themselves balance in said bridge means, and, when the fluxes are out of balance, the resultant out of balance flux passes between the bridge means and the armature.

3. For controlling dynamoelectric generators a field system having poles each comprising at least two circumferentially-spaced part-poles, the first of said part-poles being relatively saturated and each other part-pole being relatively unsaturated; a set of field coils wound on the relatively saturated part-pole; a further set of field coils wound on each relatively unsaturated part-pole; a control circuit having said sets of field coils connected therein so as to act on the armature in opposition; magnetic bridge means positioned adjacent the armature of the generator and interconnecting one end of each part-pole, said interconnected ends being of opposed polarity, variation in the resultant out of balance flux of two opposed part-poles acting to control the resultant flux at said bridge means; and a field yoke return path magnetically connected with the first part-pole and completing the magnetic circuit between said part-poles and defining an air-gap with the end of each relatively unsaturated part-pole remote from the bridge means, whereby, when the fluxes of said part-poles are in balance, the fluxes themselves balance in said bridge means, and, when the fluxes are out of balance, the resultant out of balance flux passes between the bridge means and the armature.

4. A field system as claimed in claim 3, in which said sets of field coils are series connected.

5. For controlling dynamoelectric generators a field system having poles each comprising two circumferentially-spaced part-poles, the first part-pole being relatively saturated and the second part-pole being relatively unsaturated, said poles being U-shaped and said first and second part-poles forming the limbs of said U; a control circuit consisting of one field coil per pole, each coil spanning from the inside of one pole to the inside of the adjacent pole and surrounding the first and the second part-pole from each of said poles; magnetic bridge means positioned adjacent the armature of the generator and interconnecting one end of each part-pole, said interconnected ends being of opposed polarity, variation in the resultant out of balance flux of the two opposed part-poles acting to control the resultant flux at said bridge means; and a field yoke return path magnetically connected to the first part-pole and completing the magnetic circuit between said part-poles and defining an air-gap with the end of the second part-pole remote from the bridge means, whereby, when the fluxes of said part-poles are in balance, the fluxes themselves balance in said bridge means, and, when the fluxes are out of balance, the resultant out of balance flux passes between the bridge means and the armature.

6. For controlling dynamoelectric generators a field system having poles each comprising at least two circumferentially-spaced part-poles, the first of said part-poles being relatively saturated and each other part-pole being relatively unsaturated; a set of field coils wound on the relatively saturated part-pole; a further set of field coils wound on each relatively unsaturated part-pole; a control circuit having said sets of field coils connected therein so as to act on the armature in opposition; an amortisseur coil on said relatively saturated part-pole to damp out any transient change in the flux thereof; magnetic bridge means positioned adjacent the armature of the generator and interconnecting one end of each part-pole, said interconnected ends being of opposed polarity, variation in the resultant out of balance flux of the opposed part-poles acting to control the resultant flux at said bridge means; and a field yoke return path magnetically connected to the first part-pole and completing the magnetic circuit between said part-poles, whereby, when the fluxes of said part-poles are in balance, the fluxes themselves balance in said bridge means, and, when the fluxes are out of balance, the resultant out of balance flux passes between the bridge means and the armature.

References Cited in the file of this patent

UNITED STATES PATENTS

| | | |
|---|---|---|
| 1,202,752 | Newton | Oct. 24, 1916 |
| 2,404,209 | Boyles | July 16, 1946 |